(No Model.)
M. W. PARRISH.
ELECTRIC BATTERY.
No. 431,073. Patented July 1, 1890.
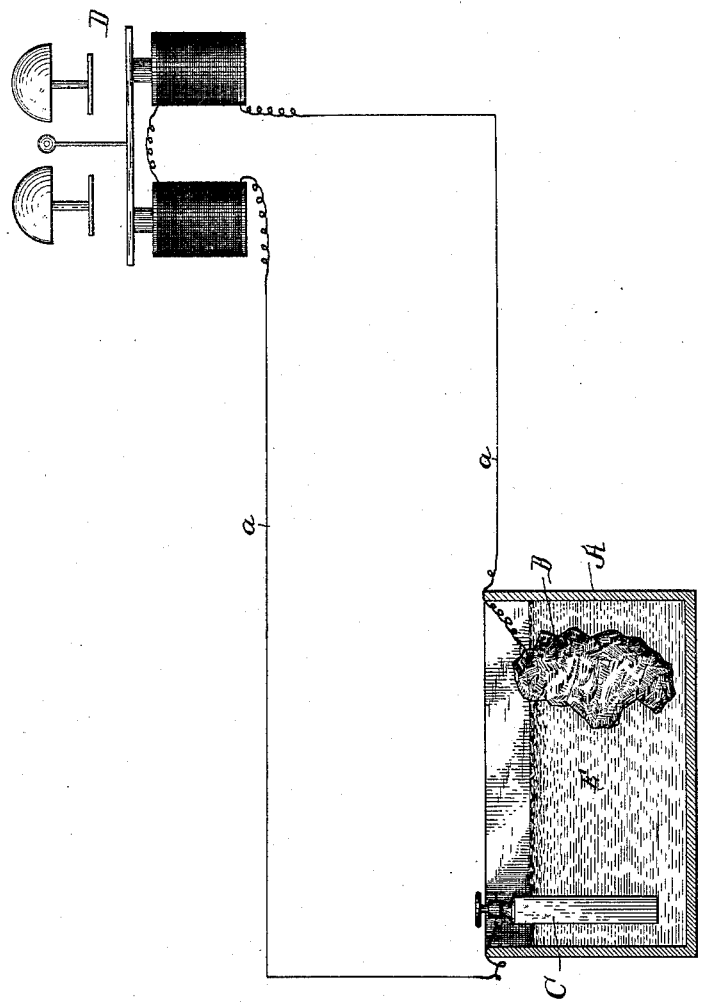
Witnesses:
Walter S. Wood
Walter English
Inventor.
Myron W. Parrish
By Lucius C. West
Atty

UNITED STATES PATENT OFFICE.

MYRON W. PARRISH, OF DETROIT, MICHIGAN, ASSIGNOR, BY DIRECT AND MESNE ASSIGNMENTS, TO JUNIUS A. BOWDEN AND THE GRAPHITE ELECTRIC COMPANY, OF SAME PLACE, AND JOHN HUTCHINSON, OF JACKSON, MICHIGAN.

ELECTRIC BATTERY.

SPECIFICATION forming part of Letters Patent No. 431,073, dated July 1, 1890.

Application filed December 2, 1889. Serial No. 332,233. (No model.)

*To all whom it may concern:*

Be it known that I, MYRON W. PARRISH, a citizen of the United States, residing at Detroit, county of Wayne, State of Michigan, have invented a new and useful Voltaic Battery, of which the following is a specification.

This invention consists in a battery in which the negative element of the battery is a rough irregularly-shaped piece of graphite in its crude condition, as when taken from the mine.

It further consists in a battery in which said negative element is employed, and in which battery the solution consists of common salt and water.

By employing the above-described negative element as one of the electrodes of the battery said element and the positive element may be placed in the same jar without the use of a porous cup, because the nature and structure of the graphite are such that a short-circuiting contact within the cell is not easily made, and, as stated below, a contact of the positive and negative elements will not depolarize the former.

In the drawing forming a part of this specification is shown an elevation of a bell and circuit and the battery-jar in vertical section.

Referring to the lettered parts of the drawing, D is the bell, and *a a* the circuit-wires, as in ordinary constructions. The jar A contains a solution of common salt and water E. The zinc element, as in ordinary batteries, is shown at C. The graphite D takes the place of carbon, and is in the crude state, as when taken from the mine. This graphite is a successful conductor of the electric current, and the zinc cannot become depolarized even if it contacts directly with the graphite.

The action of the solution upon the metal in the graphite frees the latter of said metal and fits it into condition to be easily pulverized for manufacturing into carbon sticks. By this means the graphite performs its service in the battery while being prepared for another valuable use, and a battery is obtained which will produce a much more powerful current than has heretofore been accomplished with a primary battery, and a current is obtained that is nearly, if not quite, equal to that of a secondary battery of the same size.

Having thus described my invention, what I claim as new, and desire to secure by Letters Patent of the United States, is—

1. An electrode for a voltaic battery which consists of an irregular piece or mass of graphite in its crude state as it comes from the mine, substantially as set forth.

2. An electric battery the solution of which consists of common salt and water, and the negative element of which consists of an irregular piece or mass of graphite in its crude state, as when taken from the mine, substantially as set forth.

In testimony of the foregoing I have hereunto subscribed my name in presence of two witnesses.

MYRON W. PARRISH.

Witnesses:
W. H. CHAMBERLIN,
MARION A. REEVE.